United States Patent
Paila et al.

(10) Patent No.: US 7,171,198 B2
(45) Date of Patent: Jan. 30, 2007

(54) METHOD, NETWORK ACCESS ELEMENT AND MOBILE NODE FOR SERVICE ADVERTISING AND USER AUTHORIZATION IN A TELECOMMUNICATION SYSTEM

(75) Inventors: Toni Paila, Degerby (FI); Lin Xu, Lempäälä (FI)

(73) Assignee: Nokia Corporation, Espoo (FI)

( * ) Notice: Subject to any disclaimer, the term of this patent is extended or adjusted under 35 U.S.C. 154(b) by 92 days.

(21) Appl. No.: 10/467,569

(22) PCT Filed: Feb. 11, 2002

(86) PCT No.: PCT/FI02/00101

§ 371 (c)(1),
(2), (4) Date: Aug. 8, 2003

(87) PCT Pub. No.: WO02/065803

PCT Pub. Date: Aug. 22, 2002

(65) Prior Publication Data

US 2004/0072557 A1    Apr. 15, 2004

(30) Foreign Application Priority Data

Feb. 9, 2001    (FI) ................................. 20010253

(51) Int. Cl.
*H04Q 7/20* (2006.01)
*H04M 1/66* (2006.01)

(52) U.S. Cl. .............................. 455/432.1; 455/435.1; 455/435.2; 455/411

(58) Field of Classification Search ............. 455/414.1, 455/450, 432.1, 432.3, 435.2, 411, 452.2; 340/825.28, 825.29
See application file for complete search history.

(56) References Cited

U.S. PATENT DOCUMENTS 4,823,122 A * 4/1989 Mann et al. ........... 340/825.28

(Continued)

FOREIGN PATENT DOCUMENTS

EP        1 111 872 A2    6/2001

(Continued)

*Primary Examiner*—Lester G. Kincaid
*Assistant Examiner*—Marivelisse Santiago-Cordero
(74) *Attorney, Agent, or Firm*—Squire Sanders & Dempsey LLP

(57) ABSTRACT

A network access sequence for a mobile node (MN) in one or more foreign domains (FD). A foreign domain sends (A1) service advertisement messages (M1), each of which comprises an identifier (41) of the message, network address information (43) and a detailed service offering (42). The mobile node stores (A2) the detailed service offerings and selects one of them. Then it sends a service request message (M2) to the foreign domain which sent the selected service offering (62). The service request indicates (55) the selected service offering (62) and the mobile node's credentials (54). The foreign domain conveys the credentials to the mobile node's home domain (HD) for authentication and authorization and checks (A4) if the selected service offering (62) can be supported. Next the foreign domain (FD) allocates communication resources for supporting the selected service offering and indicates (M9) to the mobile node the availability of the requested service.

22 Claims, 3 Drawing Sheets

U.S. PATENT DOCUMENTS

| | | | |
|---|---|---|---|
| 5,581,802 A * | 12/1996 | Erickson et al. | 455/510 |
| 5,590,397 A | 12/1996 | Kojima | |
| 5,862,471 A * | 1/1999 | Tiedemann et al. | 455/406 |
| 5,915,214 A | 6/1999 | Reece et al. | |
| 5,983,092 A * | 11/1999 | Whinnett et al. | 455/406 |
| 6,101,379 A | 8/2000 | Rahman et al. | |
| 6,173,179 B1 | 1/2001 | Coutant | |
| 6,185,413 B1 | 2/2001 | Mueller et al. | |
| 6,324,395 B1 * | 11/2001 | Khayrallah et al. | 455/406 |
| 6,337,981 B1 * | 1/2002 | Peters | 455/432.3 |
| 6,496,704 B2 * | 12/2002 | Yuan | 455/466 |
| 6,622,016 B1 * | 9/2003 | Sladek et al. | 455/414.1 |
| 6,988,146 B1 * | 1/2006 | Magret et al. | 709/238 |
| 2002/0095333 A1 * | 7/2002 | Jokinen et al. | 705/14 |

FOREIGN PATENT DOCUMENTS

| | | |
|---|---|---|
| FI | 106671 B | 3/2001 |
| WO | WO/00/45614 | 8/2000 |
| WO | WO 00/72149 A1 | 11/2000 |

\* cited by examiner

M1 = SO(SO_ID, SO_PLD, FD_NAI, ATT_ADDR, VALID, SIG_FD)
M2 = MIP_RegReq+SR
M3 = AMR + SR
M4 = AMR
M5 = HAR
M6 = HAA
M7 = AUTH_STATUS + MN-FA_KEY
M8 = SI+AUTH_STATUS + MN-FA_KEY
M9 = MIP_RegReply + SI + AUTH_STATUS + MN-FA_KEY SR = MN_NAI + AAA_CRED + SO_ID
SI = SI_STATUS + FD-AUTH + SI_INFO + MN-FD_key A1 = Advertise services
A2 = Select SO, authenticate sender, verify integrity
A4 = Is the SR valid? Can it be supported?

METHOD, NETWORK ACCESS ELEMENT AND MOBILE NODE FOR SERVICE ADVERTISING AND USER AUTHORIZATION IN A TELECOMMUNICATION SYSTEM

BACKGROUND OF THE INVENTION

The invention relates to methods and equipment for service advertising and user authorization in a telecommunication system.

Two trends in telecommunications act as a driving force for the invention. One of the trends is the fact that distinctions between different communication technologies and terminal equipment will be increasingly blurred, and a single multi-mode terminal will be used to access a wide variety of different services, such as e-mail, web surfing, radio and TV programs, etc. Multimode terminals have several alternative access techniques, such as any combination of cellular radio (GSM, GPRS, UMTS, etc.), DAB, DVB, WLAN, etc. The other trend is that backbone networks are increasingly based on Internet Protocol (IP).

In a GSM environment, operator (network) selection is simple: a subscriber of a given network cannot normally select another operator in his/her home country. When roaming abroad, most mobile phones select the strongest carrier unless the user manually overrides the phone's automatic selection.

A first problem with multi-mode terminals is that a manual network selection is too cumbersome, and an automatic selection based on signal strength is not sufficient. Thus there is need for more advanced network selection. Such an advanced network selection in turn causes a second problem, namely the fact that a terminal (or its user) should be authenticated in several networks before the terminal can select a network. The multiple authentication in turn has a third problem which has not existed in earlier systems, namely a complete lack of trust between a network operator and roaming user. In conventional mobile networks, such as GSM, the network infrastructure is so expensive and extensive that a roaming user, seeing an operator's name on the display of the terminal, can automatically trust that the operator is what it claims to be. In other words, it is infeasible to set up a GSM network for fraudulent purposes, such as eavesdropping. In WLAN environments, for example, this assumption may not be valid. For example, it is possible for an eavesdropper to set up a WLAN system in places where important information can be obtained. If the eavesdropper's system offers WLAN services that seem more attractive than those of its competitors, a terminal may select an untrustworthy network, and data privacy will be lost. Thus a novel problem is that not only must a network operator authenticate a roaming user but the user must also be able to establish trust with the network operator.

DISCLOSURE OF THE INVENTION

An object of the invention is to provide a mechanism for solving the first and second problems stated above. In other words, an object of the invention is to provide a network access sequence in which a mobile node in a foreign domain can register to use the services of an optimal service provider.

This object is achieved with a method and equipment which are characterized by what is disclosed in the attached independent claims. Preferred embodiments of the invention are disclosed in the attached dependent claims.

A network access sequence according to the invention for providing services to a mobile node in one or more foreign domains can be implemented as follows. The foreign domains send service advertisement messages, each service advertisement message comprising 1) an identifier of the service advertisement message in question; 2) network address/identity information relating to the foreign domain in question; and 3) a detailed service offering. The mobile node receives and stores (at least temporarily) the detailed service offerings and selects a detailed service offering. The mobile node sends a service request message to the foreign domain which sent the selected service offering. The service request message indicates the selected service offering and the credentials of the mobile node. The foreign domain conveys the credentials of the mobile node to the mobile node's home domain for authentication and authorization. The foreign domain checks if the selected service offering can be supported on the basis of available communication resources, and if it can be supported, the foreign domain allocates communication resources for supporting the selected service offering and indicates to the mobile node the availability of the selected and requested service.

According to a preferred embodiment of the invention, the foreign domain certifies each service advertisement message with a digital certificate and the mobile node verifies the digital certificate by opening it with the foreign domain's public key. In this way, the third problem above is solved and a two-way trust relationship is dynamically established between the mobile node and the foreign domain.

According to another preferred embodiment of the invention, the foreign domain performs the resource-checking step after it has conveyed the credentials of the mobile node to the mobile node's home domain for authentication and authorization. In this way the resource-checking and the authentication/authorization steps can be performed in parallel, which saves time.

BRIEF DESCRIPTION OF THE DRAWINGS

The invention will be described in more detail by means of preferred embodiments with reference to the appended drawings in which.

DETAILED DESCRIPTION OF THE INVENTION

Preferred embodiments of the invention will be described using the following terminology. Since the term "network" is somewhat vague, the term "domain" will be used instead. A domain is one or more portions of a telecommunication system under a common administration. A subscriber's home domain (network) is the domain with the operator of which the subscriber has a subscription. Other domains are foreign domains. The term "network" will be used in connection with well-established terms like "network access", "network address" or "network element". In Mobile IP (Internet Protocol), the terms home agent and foreign agent are frequently used. The term "attendant", as used herein, is a close relative of a foreign agent known from the Mobile IP protocol (MIP). To be more precise, "foreign agent" is a term used in connection with the Mobile IP protocol, whereas "attendant" is commonly used in an AAA environment. An AAA attendant may constitute a part of a MIP foreign agent.

Figure 1:
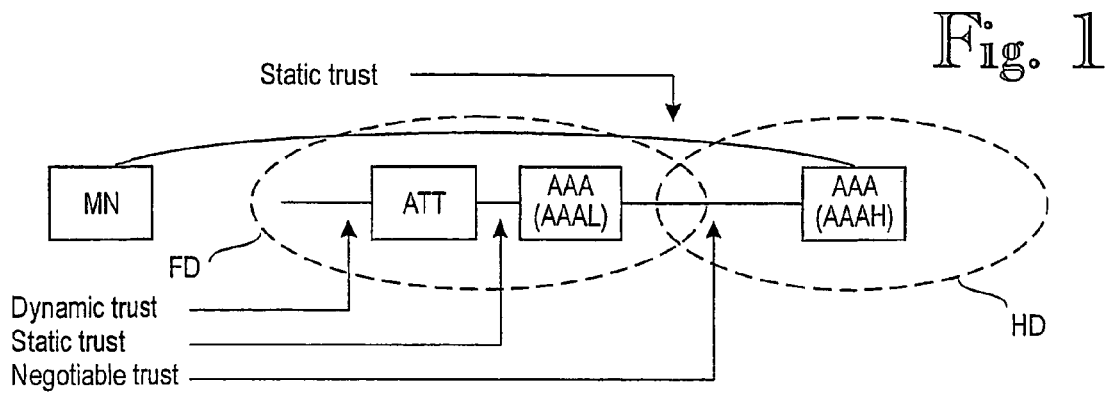
FIG. 1 illustrates a trust model according to the invention.

FIG. 1 illustrates a trust model according to the invention. A mobile node MN, whose home domain is HD, is going to register in a foreign domain FD. Each domain has an AAA element or server. 'AAA' stands for authentication, authorization and accounting. The AAA of the mobile node's home domain is called AAAH, and the one in the foreign domain is called AAAL. (In some documents, it is called AAAF, wherein 'F' means foreign, but AAAL appears to be more common.) That is, each AAA element acts as an AAAH to mobile nodes of its own domain and as an AAAL to roaming mobile nodes. There is also an attendant ATT for assisting the mobile node's registration process. A possible location of the attendant is within a MIP (Mobile IP) foreign agent. The intervening network elements, such as radio stations and the like, have been omitted for clarity.

At the beginning of the registration process, the operator of the foreign domain FD cannot trust the mobile node MN, and the MN user cannot automatically trust the FD operator. But there is static (permanent) trust between the mobile node and its AAAH. Likewise, the foreign domain's AAAL has a static trust relationship to the attendant in the same FD. Between the domains HD and FD, a trust relationship can be negotiated, for example by exchanging digital certificates. In other words, there is a negotiable trust relationship between the HD and FD. A problem is that the mobile node cannot directly access its home domain (which it trusts) but only via the foreign domain's attendant, and there is a two-way lack of trust between the mobile node and the attendant. According to the invention, a dynamic trust relationship is established between the mobile node and the attendant, as will be shown in in more detail in connection with FIG. 3. A dynamic trust relationship is a short-term trust relationship. It is typically negotiated via one or more third parties for the duration of one session.

Figure 2:
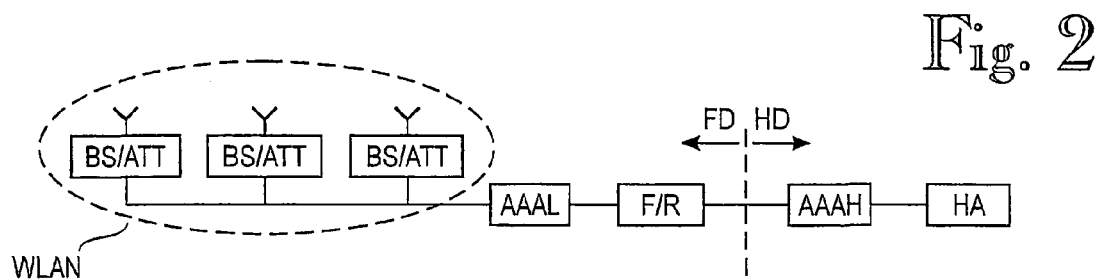
FIG. 2 illustrates how the trust model can be mapped to concrete network elements.

FIG. 2 illustrates how the trust model can be mapped to concrete network elements. In FIG. 2, there is a wireless local area network WLAN comprising three base stations BS. Each base station has an integrated attendant. There is an AAAL server serving the WLAN network and a filter/router F/R for communicating with external networks, one of which is the mobile node's home domain. The attendant extracts identification and authorization data sent by the mobile node and forwards them to the AAAL for verification. It is also responsible for configuring the filter/router F/R so that only authorized clients can access the network.

Figure 3:
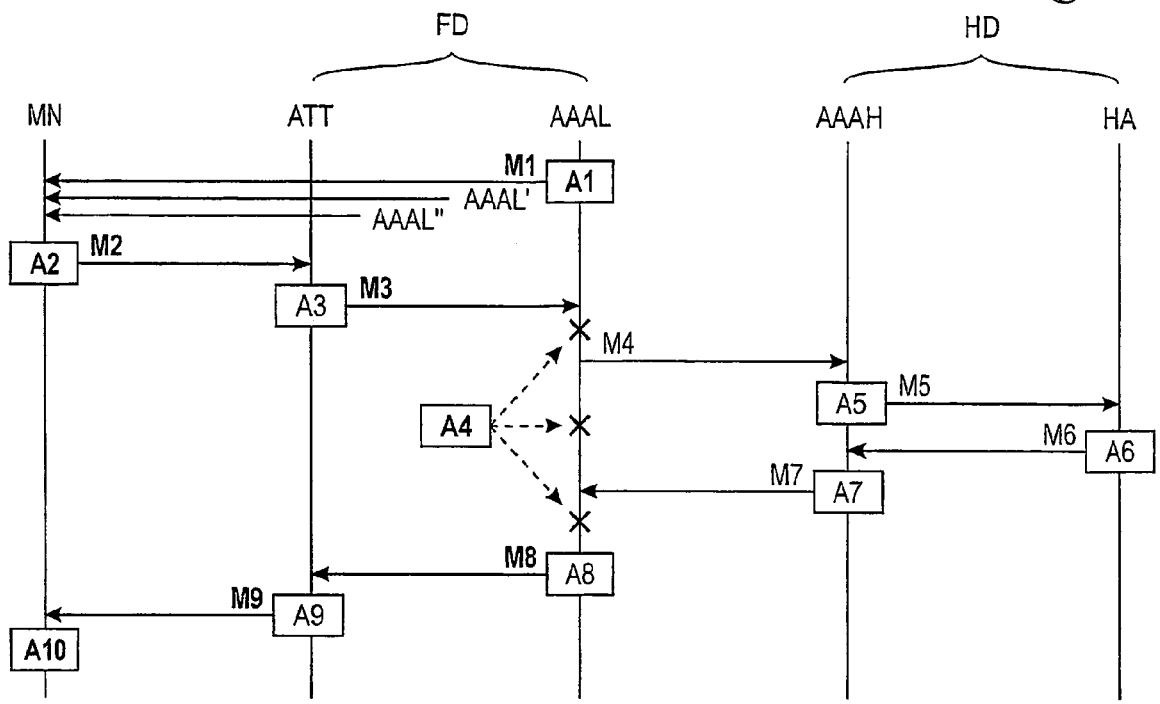
FIG. 3 is a signalling diagram illustrating a mobile node's registration procedure according to a preferred embodiment of the invention.

FIG. 3 is a signalling diagram illustrating a network access sequence according to a preferred embodiment of the invention. The procedure is based on a protocol referred to as Diameter, and it is specified in references [DIA base] and [DIA mobile]. The references are listed at the end of this description. The procedure shown in FIG. 3 comprises 10 actions and 9 messages. The actions are labelled A1 through A10, and the messages are labelled M1 through M9. This embodiment proposes changes to actions A1, A2, A4 and A10 and to messages M1, M2, M3, M8 and M9. In FIG. 3 these actions and messages are shown in a bold typeface. The remaining actions and messages can be as specified in the Diameter references.

In action A1, a local AAA server AAAL maintains a database (or table) of the services offered by it. The services are accompanied with other relevant parameters, for example cost, availability, etc. The AAAL is triggered to select periodically one or more services to be offered to mobile clients. After that, the AAAL prepares a service offering to be delivered for a mobile node or a group of mobile nodes.

Message M1 comprises the actual service offering by the AAAL. The format and the delivery technique of the service offering are not essential for the invention. Possible delivery techniques include a router advertisement, an on-request reply and broadcasting over some control channel. Only the information contained in the service offering is important. A service offering should contain at least items 1 through 4 of the following list, and optionally items 5 and/or 6:

1. SO_ID (=service offering identifier): A unique identifier of the service offering. The identifier serves to distinguish service offerings having the same origin.
2. SO-PLD (service offering—payload): The payload or the actual service being offered. The format and contents are not essential for the invention. An example of a service offering payload will be described in connection with FIGS. 4 and 6.
3. FD-NAI (Foreign Domain—Network Access Identifier): Identifies the sender of the service offering in the foreign domain, preferably in the form of a Network Access Identifier (NAI), see [DIA Base]. A combination of a SO_ID and a FD-NAI is globally unique.
4. ATT-ADDR (Attendant Address): Network or link level access information on how to contact an attendant that can accept a request for this service offering. This may be an IP address, MAC address or even a valid socket address for an application.
5. VALID: An optional validity time indicating how long the service offering remains valid.
6. SIG-FD: An optional digital signature signed by the sending AAAL. Any signature algorithm can be used. For example, the signature can be calculated over the remaining items 1 through 5 of the service offering message.

Figure 4:
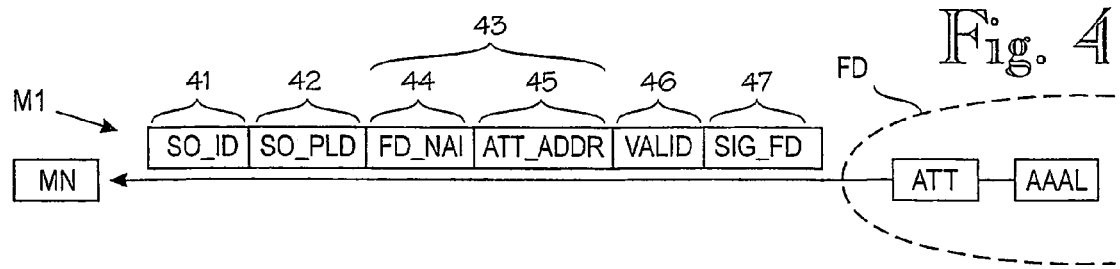
FIG. 4 illustrates a service advertisement message.

FIG. 4 illustrates how the above items can be sent in a service advertisement message. Field 41 is the service offering identifier SO_ID which will be used later to identify the service offering selected by the mobile node. Field 42 is the service offering payload SO_PLD which specifies the details of the actual offering, such as tariff, bandwidth (speed) maximum delay, maximum error rate, etc. Fields 44 and 45 constitute network access information 43 which is basically the contents of a prior art service/router advertisement message. Field 46 is optional and indicates the validity time/period of the service offering. Field 47 is also optional. It is a digital signature computed over the remaining fields of message M1 and signed with the private key of the foreign domain FD. By verifying this signature with the public key of the foreign domain, the mobile node may confirm the identity of the sender of message M1 (in this case, the AAAL).

It is interesting to note that prior art service/router advertisement messages are routinely called "advertisement messages". There is even a well-established session announcement protocol (SAP) that comprises such an advertisement message. But in the prior art, the service advertisement messages are used only to proclaim the existence of a network elements (a server or router). Prior art service advertisement messages have not been used to advertise services in the traditional meaning of the word "advertise". At best, the prior art service advertisement messages perform brand advertising ("I am here") but not detailed advertising ("I offer this QoS at that price"). In other words, a mobile node receiving prior art service advertisement messages from multiple foreign domains has no way of knowing which domain offers the best price/service ratio, such as the best price at a given quality of service (QoS) which is required for a given application. Alternatively, the mobile node may need to know which foreign domain offers the best QoS at a given price. Depending on the application type, the QoS may comprise factors like nominal bandwidth (data rate), minimum/maximum guaranteed bandwidth, packet delay and delay variability, guaranteed or worst-case error rate, packet loss probability, priority, etc. According to the invention, an advertisement message comprises not only an advertisement but an offer which is detailed enough to enable a meaningful comparison between service providers. A meaningful comparison requires not only knowledge of a service provider's existence (which is offered by the prior art service/router advertisement messages) but also price/tariff information and the quality of service to be delivered at the advertised price.

A traditional business model is that a client reacts to an advertisement by requesting a detailed offer, and the service provider responds to the request for offer by providing a detailed offer. The invention breaks this business model by sending a (sufficiently) detailed offer with the advertisement message, that is without an explicit request from the client.

Figure 5:
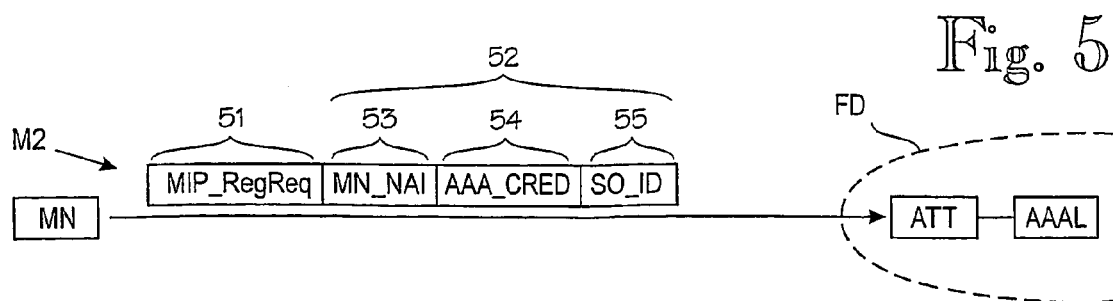
FIG. 5 illustrates a service request message.

FIG. 5 illustrates an example of a service request message M2. Field 51 is a mobile IP registration request, which is known from prior art. Fields 53 through 55 constitute the actual service request 52 which is related to requesting the service according to the service offering selected by the mobile node. Field 53 is a Mobile IP Network Access Identifier Extension for IPv4 (see RFC 2794). Field 54 is the mobile node's credentials, such as Mobile IP Challenge/Response Extensions (see RFC 3012). Field 55 identifies the service offering selected by the mobile node (or its user).

Reference is again made to FIG. 3. Action 1 and message 1 can be repeated any number of times. FIG. 3 also shows service offerings from two additional AAAL servers, namely AAAL' and AAAL".

In action A2, a mobile node receives one or more service offerings from one or more sources in foreign domains. Based on user needs, the mobile node selects one service offering. Details of the selection mechanism are beyond the scope of this invention. For example, the selection can be based on factors such as the offered price, bandwidth, maximum delay, error rate, etc.

If the service offering comprises a digital signature, the mobile node can use the signature to verify the service offering before trusting its sender and selecting the service offering. For example, the mobile node may use a pre-defined key to check incoming service offerings with signatures. Alternatively, it can dynamically use some external public key infrastructure for obtaining the sender's public key.

Message M2 comprises a service request (SR) from the mobile node. The mobile node constructs a service request on the basis of the information in the selected service offering. The MN then sends the SR to the attendant specified by the ATT-ADDR field of the service offering. Message M2 must also contain the necessary information content specified in [DIA mobile]. One way to convey the SR to the attendant is to include a Mobile IP version 4 (MIPv4) mobile node registration request in a new message type. MIPv4 will be the default case from now on. A service request SR contains at least the following items:

1. MN_NAI: The mobile node's Network Access Identifier. It identifies the mobile node (or its user) and its home domain, and home authority (AAAH).
2. AAA_CRED: The AAA credentials (for example a signature of a challenge or a whole SR). AAA_CRED is the token which the AAAH uses to authenticate the mobile node or its user.
3. SO_ID: The identifier of the selected service offering (see Message M1).

The MN_NAI and AAA_CRED are required in the procedure specified in [DIA mobile]. By incorporating or attaching the SO_ID to the service request SR, the AAAL may begin resource allocation while the mobile node's home domain completes the authentication and authorization process. Also, there is no need to authorize the MN in respect of services it is not requesting.

In action A3, the attendant ATT processes the SR transparently. The ATT extracts the information from message M2 as described in [DIA mobile] to construct a DIAMETER AMR (also described in [DIA mobile]). The attendant also includes the SR in the DIAMETER AMR as a new AVP (Attribute-Value Pair). According to the invention, the DIAMETER AMR also carries the mobile node's service request.

In message M3, the attendant ATT sends the newly-constructed DIAMETER AMR with the included SR to the local authority of the foreign domain. See [DIA mobile] for details.

In action A4, the AAAL checks the validity of the service offering and checks if the requested service can be supported. For user authentication and authorization, the AAAL relies on the home authority (AAAH) of the user like in [DIA mobile]. The checking step is relevant to the invention.

Messages M4 through M7 and actions A5 through A7 relate to authenticating the mobile node in its home domain. They are normal Diameter messages and actions, see [DIA mobile] for details.

Action A4 can be performed in any one of three alternative places in the chain of events shown in FIG. 3, namely before message M4, sometime between messages M4 and M7 or after message M7. Preferably, the AAAL performs action A4 after sending message M4. This way, the AAAL can perform the checks in action A4 while the home domain authenticates and authorizes the mobile node.

In action A8, the AAAL receives an AMA (AA-Mobile-Node-Answer) from the AAAH. The result of the authentication may be success or failure. In case the authentication is successful, message M7 contains an MIPv4 registration reply (or MIPv6 binding reply). The AAAL constructs its own reply message M8 which is a normal DIAMETER AMA appended with the information content of service indication (SI). Adding the SI to the registration reply is an essential feature of the invention. The service indication contains at least items 1 and 2 of the following list, and optionally items 3 and/or 4:

1. SI_STATUS: The status, or answer, to the service request. It indicates success (0) or failure (any other value).
2. FD-AUTH: A foreign domain authenticator. An example: the entire SI message signed with the MN-FD_key. A mobile node can verify this after recovering the MN-FD_key from the SI message.
3. SI_INFO: additional information (optional). For example, in case of success, this field may contain link-level access information, an IP address and other configuration information from the AAAL. In case of failure, this field may contain a more detailed description of the reason of the failure.

4. MN-FD_key: An optional session key to be used between the mobile node and the foreign domain. It should always be originated from the AAAH and encrypted by the MN-AAAH key.

If the authentication is successful, the AAAL sends message M8 to the attendant. M8 comprises a DIAMETER AMA with an included SI.

In action A9, the attendant obtains the session keys to be used for communicating with the mobile node (and the mobile node's home agent, in case MIPv4 is used). According to the service indication, the attendant grants resources to the mobile node. A simple implementation of resource granting is that the attendant merely allows the mobile node's traffic to pass the attendant from this moment on.

Message M9 delivers the service indication to the mobile node.

Action A10 completes the chain of events shown in FIG. 3. The mobile node verifies the received service indication (if the optional signature is used) and the binding acknowledgement BA, and begins to use the offered service.

Figure 6:
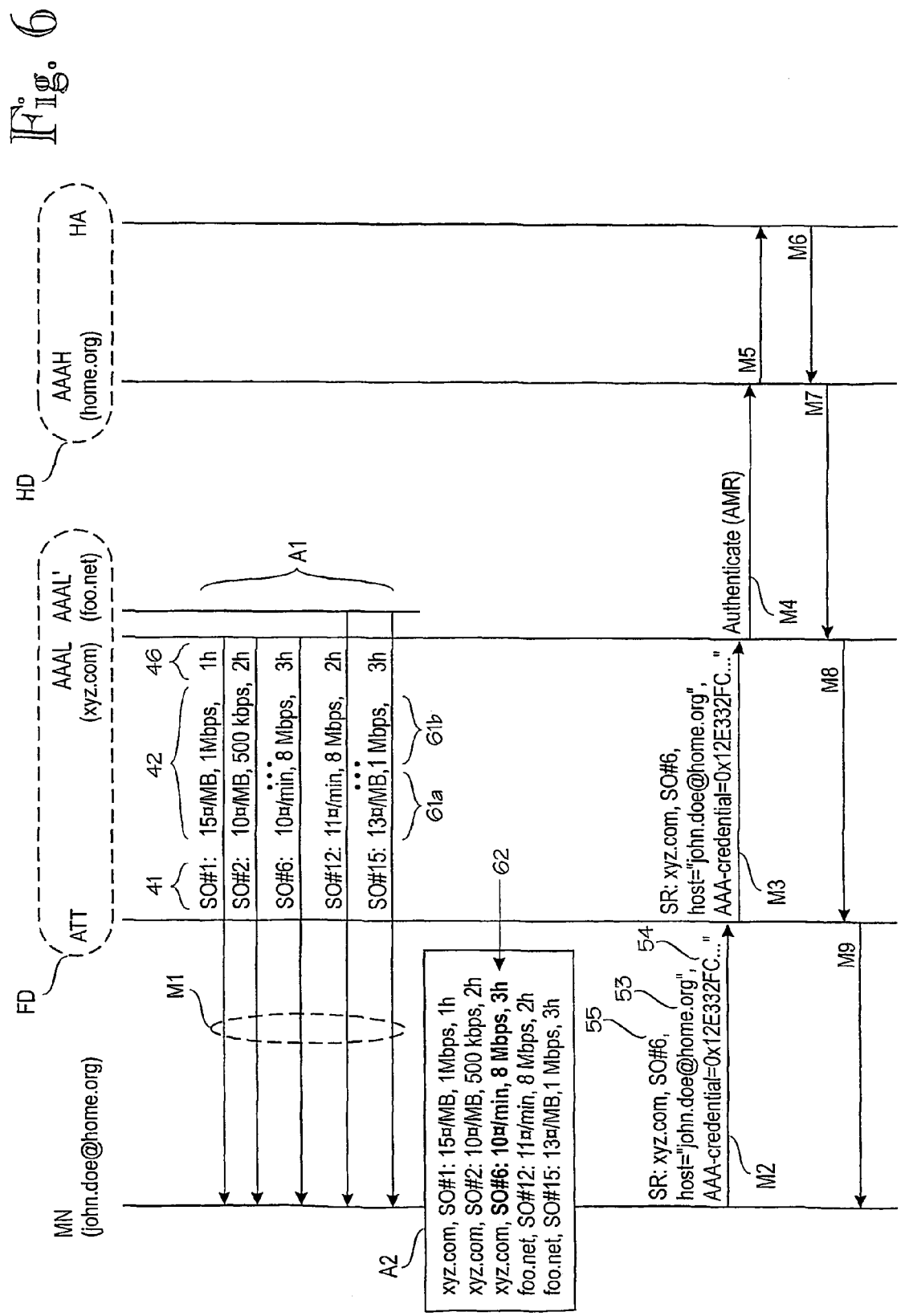
FIG. 6 is a signalling diagram illustrating a process in which a mobile node selects a service offering among the various service offerings sent by different mobile networks.

FIG. 6 is a signalling diagram illustrating a process in which a mobile node selects a service offering among the various service offerings sent by different mobile operators. Actions A1, A2, etc., and messages M1 through M9 shown in FIG. 6 are basically similar to the corresponding elements in FIG. 3, the difference being that in FIG. 6 the emphasis is on the service offerings and service requests.

In the example shown in FIG. 6, action A1 comprises sending several service offerings SO#1 through SO#15 from two local AAA servers AAAL and AAAL'. The domain (network) addresses of the AAAL servers are xyz.com and foo.net, respectively. In FIG. 6, the detailed service offering 42 has been divided into two fields 61a and 61b. Field 61a indicates a price or tariff and field 61b indicates the quality of service at the offered price or tariff. For example, a first service offering has an identifier SO#1, and it indicates a tariff of 15¤ (currency units) per megabyte and a maximum data rate of 1 megabit per second. As indicated by its field 46, the service offering is valid for one hour. The remaining service offerings are constructed similarly, but identifiers SO#6 and SO#12 relate to offerings with a minute tariff instead of a megabyte tariff. All offerings SO#1 through SO#15 are collectively referred to as message M1 and the act of sending them is collectively referred to as action A1.

In order to maintain the clarity of, FIG. 6, the quality of service field 61b comprises only one component, namely a nominal bandwidth. As stated earlier, the QoS may also comprise other components, such as a guaranteed bandwidth, packet delay and delay variability, guaranteed or worst-case error rate, packet loss probability, priority, etc. (In all radio traffic, however, "guaranteed" should be interpreted as "best-effort".) Although all the example service offerings in FIG. 6 SO#1 through SO#15 relate to simple bearer (connectivity) services, the services to be offered can comprise more advanced services, such as a user's ability to create multicast sessions, etc.

In action A2, the mobile node MN receives and collects (at least temporarily) the service offerings having the identifiers SO#1 through SO#15 sent by different mobile operators. At this stage, the mobile node can either present the service offerings to its user and receive the user's selection, or it can perform the selection automatically, on the basis of some pre-stored criteria, such as the lowest tariff among the services meeting some minimum requirements (bandwidth, error rate, delay, delay variance, etc.) In this example, the mobile node or its user selects service offering 62 from xyz.com. Next the mobile node MN sends message M2 to the attendant ATT. Message M2 comprises a service request SR which in turn comprises the FD_NAI (xyz.com) of the AAAL, the identifier of the selected service offering (SO#6), the MN user's network address in its home domain (john.doe@home.org) and the mobile node's (or its user's) AAA credentials which is a digital certificate. The attendant conveys the contents of message M2 to the AAAL in message M3.

At this stage, the AAAL does not yet trust the mobile node MN. Therefore the AAAL sends the mobile node's credentials to the MN's home AAA server AAAH for authentication and authorization.

The fact that the mobile node MN receives and collects service offerings sent by different mobile operators has several alternative implementations. For example, the mobile node may collect service offerings until it appears to have all the available information; in other words, the MN receives repeated service offerings. After that, the MN or its user may select an optimal service offering. Alternatively, the mobile node may have a set of criteria for each application, such as a minimum bandwidth/maximum price, and as soon as a service offering fulfils the criteria, it is automatically selected. The actual selection process is not relevant to the invention. Also, the mobile node may select more than one service offering, such as one for voice calls and another for file downloads.

The above description is not tied to any specific protocol versions. Three different implementations with different protocols will be described next. The differences are limited to the over-the-air messages M1, M2 and M9. The three different protocols are Mobile IP version 4 (MIPv4), Mobile IP version 6 (MIPv6) and AAA version 6 (AAAv6).

In a MIPv4 implementation, message M1 can be transported in an ICMP (Internet Control Message Protocol) Router Advertisement. M1 may appear with a Mobility Agent Advertisement Extension [RFC 2002, 2.1.1]. The service offering identifier SO_ID and the service offering payload SO_PLD (fields 41 and 42 in FIG. 4) can be implemented as new extensions to ICMP Router Advertisements. The Foreign Domain Network Access Identifier FD_NAI (field 44) can be implemented as a generalized NAI Extension. For an implementation of a NAI extension, reference is made to [AA]. The attendant address ATT_ADDR, validity period VALID and the foreign domain signature FD_SIG (fields 45, 46 and 47) can be implemented as new extensions to ICMP Router Advertisements.

Message M2 can be transported in a MIPv4 registration request. The actual registration request (field 51 in FIG. 5) can be a plain MIPv4 registration request header, see [RFC 2002]. The MN's Network Access ID MN_NAI (field 53) can be as disclosed in [RFC 2794]. The MN's credentials AAA_CRED (field 54) can be as disclosed in [RFC 3012]. The service offering identifier SO_ID (field 55) can be a new extension to [RFC 2002]. Finally, message M9 may be an MIPv4 registration reply appended with a new extension to support service indication (SI).

In an MIPv6 implementation, message M1 can be transported in an IPv6 Neighbour discovery message, see [RFC 2461]. M1 may appear with a modified Router Advertisement Message, see [MIPv6]. The service offering identifier SO_ID and the service offering payload SO_PLD (fields 41 and 42 in FIG. 4) can be implemented as new extensions to ICMPv6 Router Advertisements. The Foreign Domain Network Access Identifier FD_NAI (field 44) can be implemented as a generalized NAI Extension. The attendant address ATT_ADDR, validity period VALID and the foreign domain signature FD_SIG (fields 45, 46 and 47) can be implemented as new extensions to ICMPv6 Router Advertisements.

Message M2 can be transported in a MIPv6 registration request. The actual registration request (field 51 in FIG. 5) can be a plain MIPv6 registration request header, see [MIPv6]. The MN's Network Access ID MN_NAI (field 53) can be carried as a client identifier option, see [AAA]. The MN's credentials AAA_CRED (field 54) can be carried as a Security Data option, see [AAA]. The service offering identifier SO_ID (field 55) can be a new option. Message M2 thus requires a new option in addition to a binding update (BU) option. Finally, message M9 may be an MIPv6 registration reply appended with a new extension to support SI.

The AAAv6 specifications do not list any specific ways of transporting message M1, but it can be transported in one of at least three ways, namely 1) in a MIPv4 router advertisement (in an MIPv4 implementation), 2) in a MIPv6 router advertisement option plus a new extension (MIPv4 implementation), or 3) as a new ICMPv6 message). All of the above fields 41, 42 and 44 through 47 can be implemented as new options to AAAv6. Message M2 can be transported in a MIPv6 registration request. The actual registration request (field 51 in FIG. 5) can be a plain MIPv6 registration request header, see [RFC 2002]. The MN's Network Access ID MN_NAI (field 53) can be carried as a client identifier option, see [AAA]. The MN's credentials AAA_CRED (field 54) can be carried as a Security Data option, see [AAA]. The service offering identifier SO_ID (field 55) can be a new option. Finally, message M9 may be an MIPv6 registration reply appended with a new extension to support SI.

In some cases, message M1 can be described in session description protocol (SDP) and carried to the end user via session announcement protocol (SAP). In such cases, the service is most likely a multicast session. If the SDP protocol is extended, it will be possible to describe more abstract services.

Although the invention has been described in connection with some specific embodiments, it is not limited to these examples but it can be varied within the scope of the appended claims.

[AAA]: AAA for IPv6 Network Access, Internet draft by Charles E. Perkins et al. ("draft-perkins-aaav6-02.txt")
[DIA base]: Diameter Base protocol, Internet draft by Pat R. Calhoun et al. ("draft-calhoun-diameter-17.txt")
[DIA mobile]: Diameter Mobile-IP Extensions, Internet draft by Pat R. Calhoun et al. ("draft-calhoun-diameter-mobileip-11.txt")
[MIPv6] can be found on the Internet The above Internet drafts and RFC 2002, 2461, 2794 and 3012 can be found on the Internet All references are incorporated herein by reference.

Acronyms (some are not Official)
AA: Authentication & Authorization
AAA: Authentication, Authorization and Accounting
AAAH: an AAA server in a mobile node's home domain
AAAL: a local AAA server, also called AAAF (F=foreign)
AMA/AMR: AA Mobile node Answer/Request
AVP: Attribute-Value Pair
BA: Binding Acknowledgement
BU: Binding Update
FD: Foreign domain
HAR: Home-Agent-MIP-Request
HD: Home domain
ICMP: Internet Control Message Protocol
MIP: Mobile IP
MN: Mobile Node
MN-FD_key: a key used between a mobile node and a foreign domain
NAI: Network Access Identifier
SAP: Session Announcement Protocol
SI: Service Indication
SIG_FD: a packet digitally signed by the private key of a FD (an AAAL)
SO: Service Offering
SR: Service Request

The invention claimed is:

1. A method for performing a network access sequence for a mobile node in one or more foreign domains, comprising the steps of:
the one or more foreign domains sending service advertisement messages, each service advertisement message comprising an identifier of the service advertisement message in question, network address/identity information relating to the foreign domain in question, and a detailed service offering;
the mobile node receiving and storing the detailed service offering and forming an indication of a selected detailed service offering;
the mobile node sending a service request message to the foreign domain which sent the selected service offering, the service request message comprising the indication of the selected service offering and the mobile node's credentials, wherein the selected service offering is selected from the service advertisement messages sent by the one or more foreign domains;
the foreign domain conveying the mobile node's credentials to the mobile node's home domain for authentication and authorization;
the foreign domain checking if the selected service offering can be supported on the basis of available communication resources; and
if the selected service offering can be supported, the foreign domain allocating communication resources for supporting the selected service offering and indicating to the mobile node the availability of a service according to the selected service offering.

2. A method for performing a network access sequence for a mobile node in one or more foreign domains, comprising the steps of:
the one or more foreign domains sending service advertisement messages, each service advertisement message comprising network address/identity information relating to the foreign domain in question, and a detailed service offering;
the mobile node receiving and storing the detailed service offering and forming an indication of a selected detailed service offering, and calculating an identifier of the service advertisement message in question;
the mobile node sending a service request message to the foreign domain which sent the selected service offering, the service request message comprising the indication of the selected service offering and the mobile node's credentials, wherein the selected service offering is selected from the service advertisement messages sent by the one or more foreign domains;
the foreign domain conveying the mobile node's credentials to the mobile node's home domain for authentication and authorization;

the foreign domain checking if the selected service offering can be supported on the basis of available communication resources; and if the selected service offering can be supported, the foreign domain allocating communication resources for supporting the selected service offering and indicating to the mobile node the availability of a service according to the selected service offering.

3. A method for performing a network access sequence for a mobile node in one or more foreign domains, comprising the steps of:

the one or more foreign domains sending service advertisement messages, each service advertisement message comprising an identifier of the service advertisement message in question, and network address/identity information relating to the foreign domain in question;

the mobile node receiving and storing the identifier, extracting therefrom a detailed service offering; and forming an indication of a selected detailed service offering;

the mobile node sending a service request message to the foreign domain which sent the selected service offering, the service request message comprising the indication of the selected service offering and the mobile node's credentials, wherein the selected service offering is selected from the service advertisement messages sent by the one or more foreign domains;

the foreign domain conveying the mobile node's credentials to the mobile node's home domain for authentication and authorization;

the foreign domain checking if the selected service offering can be supported on the basis of available communication resources; and if the selected service offering can be supported, the foreign domain allocating communication resources for supporting the selected service offering and indicating to the mobile node the availability of a service according to the selected service offering.

4. A method according to claim 1, comprising the steps of:
the foreign domain signing the service advertisement messages with a digital signature; and
the mobile node verifying the digital signature;
wherein a two-way trust relationship is dynamically established between the mobile node and the foreign domain.

5. A method according to claim 1, further comprising the foreign domain performing the checking step after it has performed the conveying step.

6. A method according to claim 1, further comprising the mobile node automatically forming the indication of the selected service offering on the basis of pre-stored criteria.

7. A method according to claim 1, further comprising the mobile node forming the indication of the selected service offering by presenting the detailed service offerings to a user and by receiving the user's selection.

8. A method according to claim 1, wherein the detailed service offerings indicate quality of service information.

9. A method according to claim 1, wherein the detailed service offerings indicate a validity period.

10. A network access element for supporting an access sequence of a mobile node in one or more foreign domains, the network access element comprising:

a service advertisement logic for sending service advertisement messages to the mobile node, each service advertisement message comprising an identifier of the service advertisement message in question, network address/identity information relating to the foreign domain in question, a detailed service offering and a resource allocation logic for receiving a service request message from the mobile node, the service request message comprising the mobile node's credentials and an indication of the service offering selected by the mobile node or its user, wherein the selected service offering is selected from the service advertisement messages sent by the one or more foreign domains;

conveying the mobile node's credentials to the mobile node's home domain for authentication and authorization and for receiving an authentication and authorization indication from the mobile node's home domain;

checking if the service indicated by the selected service offering can be supported on the basis of available communication resources; and allocating communication resources if the service indicated by the selected service offering can be supported.

11. A network access element for supporting an access sequence of a mobile node in one or more foreign domains, the network access element comprising:

a service advertisement logic for sending service advertisement messages to the mobile node, each service advertisement message comprising network address/identity information relating to the foreign domain in question and a detailed service offering; and a resource allocation logic for receiving a service request message from the mobile node, the service request message comprising the mobile node's credentials and an indication of the service offering selected by the mobile node or its user;

conveying the mobile node's credentials to the mobile node's home domain for authentication and authorization and for receiving an authentication and authorization indication from the mobile node's home domain;

checking if the service indicated by the selected service offering can be supported on the basis of available communication resources, wherein the selected service offering is selected from the service advertisement messages sent by the one or more foreign domains; and allocating communication resources if the service indicated by the selected service offering can be supported.

12. A network access element for supporting an access sequence of a mobile node in one or more foreign domains, the network access element comprising:

a service advertisement logic for sending service advertisement messages to the mobile node, each service advertisement message comprising -an identifier of the service advertisement message in question, -network address/identity information relating to the foreign domain in question; and a resource allocation logic for receiving a service request message from the mobile node, the service request message comprising the mobile node's credentials and an indication of a service offering selected by the mobile node or its user;

conveying the mobile node's credentials to the mobile node's home domain for authentication and authorization and for receiving an authentication and authorization indication from the mobile node's home domain;

checking if the service indicated by the selected service offering can be supported on the basis of available communication resources, wherein the selected service offering is selected from the service advertisement messages sent by the one or more foreign domains; and allocating communication resources if the service indicated by the selected service offering can be supported.

13. A network access element according to claim 10, wherein the resource allocation logic is adapted to perform the checking operation after conveying the mobile node's credentials to the mobile node's home domain.

14. A network access element according to claim 13, wherein the resource allocation logic is adapted to perform the checking operation before receiving an authentication and authorization indication from the mobile node's home domain.

15. A mobile node capable of performing a network access sequence in one or more foreign domains, comprising a service advertisement processing logic for:
receiving and storing service advertisement messages from said one or more foreign domains, each service advertisement message comprising an identifier of the service advertisement message in question; network address/identity information relating to the foreign domain in question; and a detailed service offering;
forming an indication of a selected detailed service offering; and
sending a service request message to the foreign domain which sent the selected service offering, the service request message comprising the indication of the selected service offering and the mobile node's credentials, wherein the selected service offering is selected from the service advertisement messages sent by the one or more foreign domains.

16. A mobile node capable of performing a network access sequence in one or more foreign domains, comprising a service advertisement processing logic for:
receiving and storing service advertisement messages from said one or more foreign domains, each service advertisement message comprising a network address/identity information relating to the foreign domain in question and a detailed service offering;
forming an identifier of the service advertisement message in question based on the information contained in the service offering, and an indication of a selected detailed service offering; and
sending a service request message to the foreign domain which sent the selected service offering, the service request message comprising the indication of the selected service offering and the mobile node's credentials, wherein the selected service offering is selected from the service advertisement messages sent by the one or more foreign domains.

17. A mobile node capable of performing a network access sequence in one or more foreign domains, comprising a service advertisement processing logic for:
receiving and storing service advertisement messages from said one or more foreign domains, each service advertisement message comprising an identifier of the service advertisement message in question and network address/identity information relating to the foreign domain in question;
extracting a detailed service offering from the identifier and an indication of a selected detailed service offering; and
sending a service request message to the foreign domain which sent the selected service offering, the service request message comprising the indication of the selected service offering and the mobile node's credentials, wherein the selected service offering is selected from the service advertisement messages sent by the one or more foreign domains.

18. A mobile node according to claim 15, comprising automatically forming the indication of the selected service offering on the basis of pre-stored criteria.

19. A mobile node according to claim 15, comprising forming the indication of the selected service offering by presenting the detailed service offerings to a user and by receiving the user's selection.

20. A system, comprising:
sending means, in one or more foreign domains, for sending service advertisement messages, each service advertisement message comprising an identifier of the service advertisement message in question, network address/identity information relating to the foreign domain in question, and a detailed service offering;
receiving means, in a mobile node, for receiving and storing the detailed service offering and forming an indication of a selected detailed service offering;
sending means, in the mobile node, for sending a service request message to the foreign domain which sent the selected service offering, the service request message comprising the indication of the selected service offering and the mobile node's credentials; wherein the selected service offering is selected from the service advertisement messages sent by the one or more foreign domains;
conveying means, in the foreign domain, for conveying the mobile node's credentials to the mobile node's home domain for authentication and authorization;
checking means, in the foreign domain, for checking if the selected service offering can be supported on the basis of available communication resources;
and if the selected service offering can be supported, allocating means, in the foreign domain, for allocating communication resources for supporting the selected service offering and indicating to the mobile node the availability of a service according to the selected service offering.

21. A system, comprising:
sending means, in one or more foreign domains, for sending service advertisement messages, each service advertisement message comprising network address/identity information relating to the foreign domain in question and a detailed service offering;
receiving means, in a mobile node, for receiving and storing the detailed service offering and forming an indication of a selected detailed service offering, and calculating an identifier of the service advertisement message in question;
sending means, in the mobile node, for sending a service request message to the foreign domain which sent the selected service offering, the service request message comprising the indication of the selected service offering and the mobile node's credentials; wherein the selected service offering is selected from the service advertisement messages sent by the one or more foreign domains;
conveying means, in the foreign domain, for conveying the mobile node's credentials to the mobile node's home domain for authentication and authorization;
checking means, in the foreign domain, for checking if the selected service offering can be supported on the basis of available communication resources; and
if the selected service offering can be supported, allocating means, in the foreign domain, for allocating communication resources for supporting the selected service offering and indicating to the mobile node the availability of a service according to the selected service offering.

22. A system, comprising:

sending means, in one or more foreign domains, for sending service advertisement messages, each service advertisement message comprising an identifier of the service advertisement message in question and network address/identity information relating to the foreign domain in question;

receiving means, in a mobile node, for receiving and storing the identifier, extracting therefrom a detailed service offering; and forming an indication of a selected detailed service offering;

sending means, in the mobile node, for sending a service request message to the foreign domain which sent the selected service offering, the service request message comprising the indicatfon of the selected service offering and the mobile node's credentials, wherein the selected service offering is selected from the service advertisement messages sent by the one or more foreign domains;

conveying means, in the foreign domain, for conveying the mobile node's credentials to the mobile node's home domain for authentication and authorization;

checking means, in the foreign domain, for checking the foreign domain checking if the selected service offering can be supported on the basis of available communication resources; and if the selected service offering can be supported, allocating means, in the foreign domain, for allocating communication resources for supporting the selected service offering and indicating to the mobile node the availability of a service according to the selected service offering.

* * * * *